United States Patent
Eggert, Jr. et al.

[15] 3,654,653
[45] Apr. 11, 1972

[54] PROBE APPARATUS

[72] Inventors: Walter S. Eggert, Jr., Huntingdon Valley; Christian E. Franz, Roslyn, both of Pa.

[73] Assignee: Boothe Airside Systems, Inc.

[22] Filed: Mar. 2, 1970

[21] Appl. No.: 16,174

[52] U.S. Cl. .................................... 14/72, 33/46, 296/28
[51] Int. Cl. ................................................ E01d 15/12
[58] Field of Search ............... 14/72, 71; 296/28; 33/46; 116/28

[56] References Cited

UNITED STATES PATENTS 2,538,112  1/1951  Maier ........................................ 33/46
3,038,185  6/1962  Moore ........................................ 14/71
3,159,917  12/1964  Whitehead ................................. 33/46

*Primary Examiner*—Jacob L. Nackenoff
*Attorney*—Harold T. Stowell, Harold L. Stowell, Albert Tockman and Thomas J. Greer, Jr.

[57] ABSTRACT

Sighting probe apparatus for a vehicle with an elevatable passenger compartment having an extensible and rotatable gangway-canopy structure for mating with an aircraft or terminal building to transfer passengers. The probe apparatus includes a sighting bar carried by a boom which can be extended to assume a vertical position when the gangway-canopy is in its retracted position. Novel track means are provided to rotate and retract the sighting bar to permit the gangway-canopy to be extended to an operative position.

7 Claims, 16 Drawing Figures

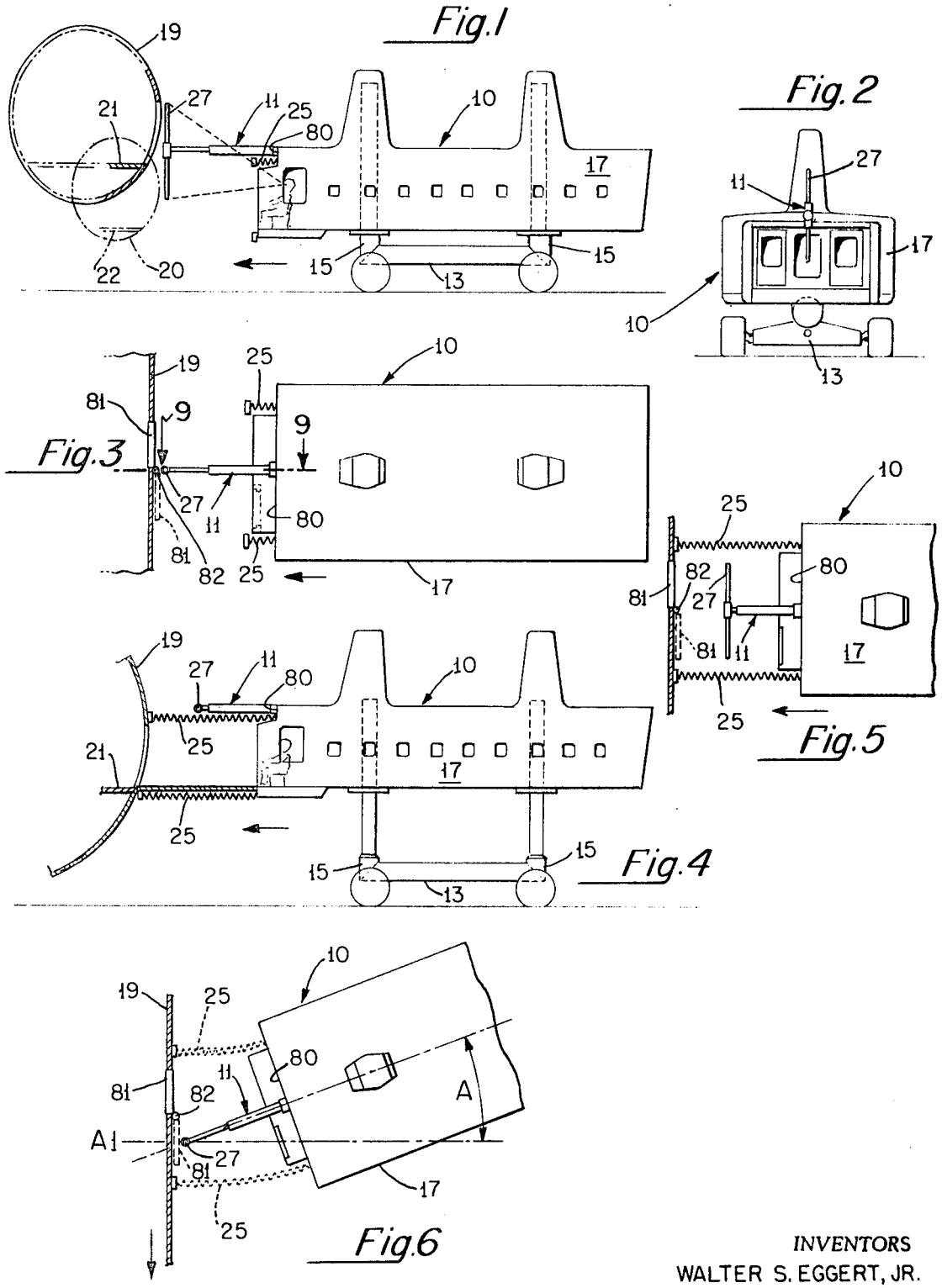

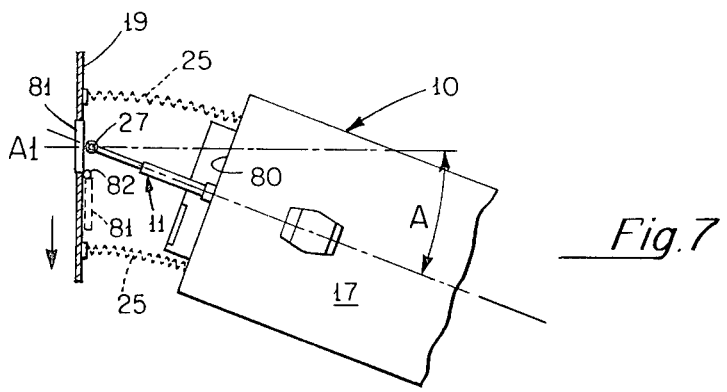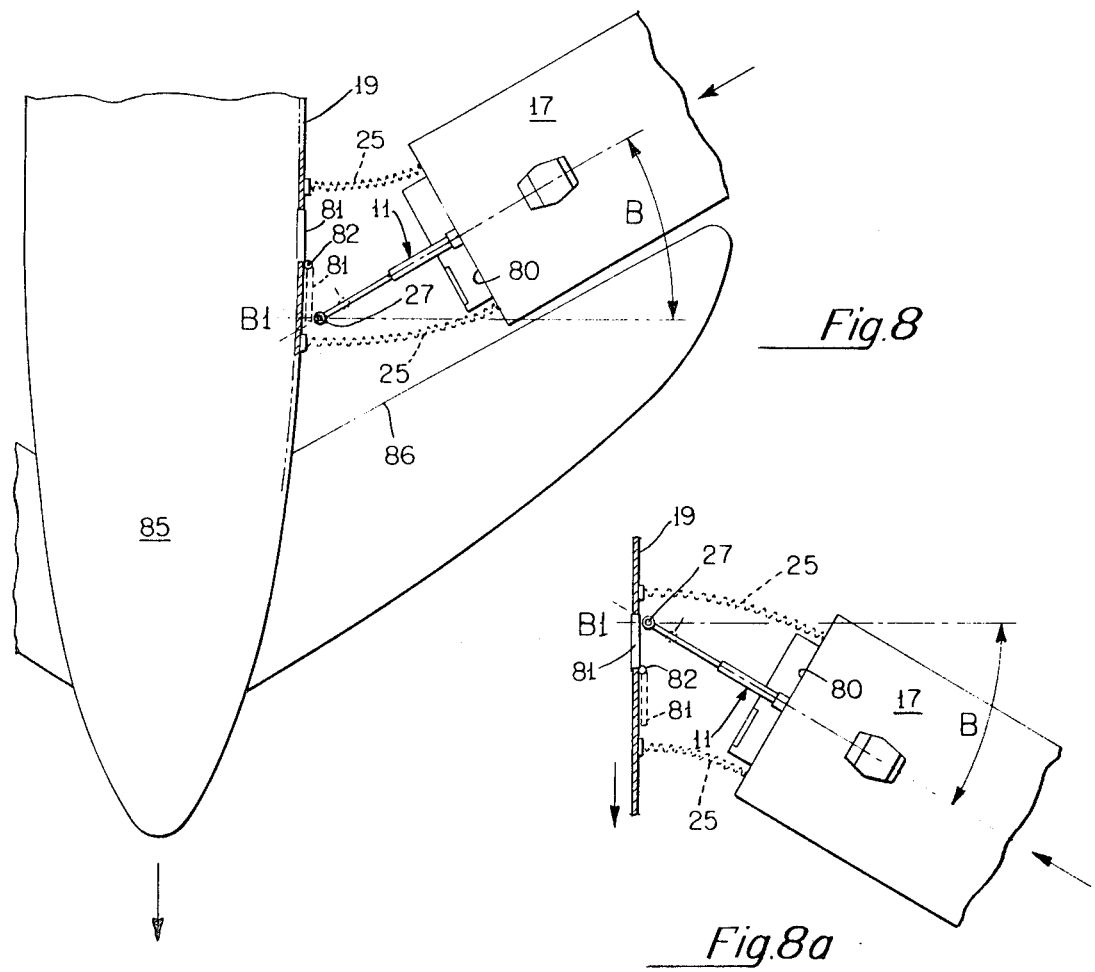

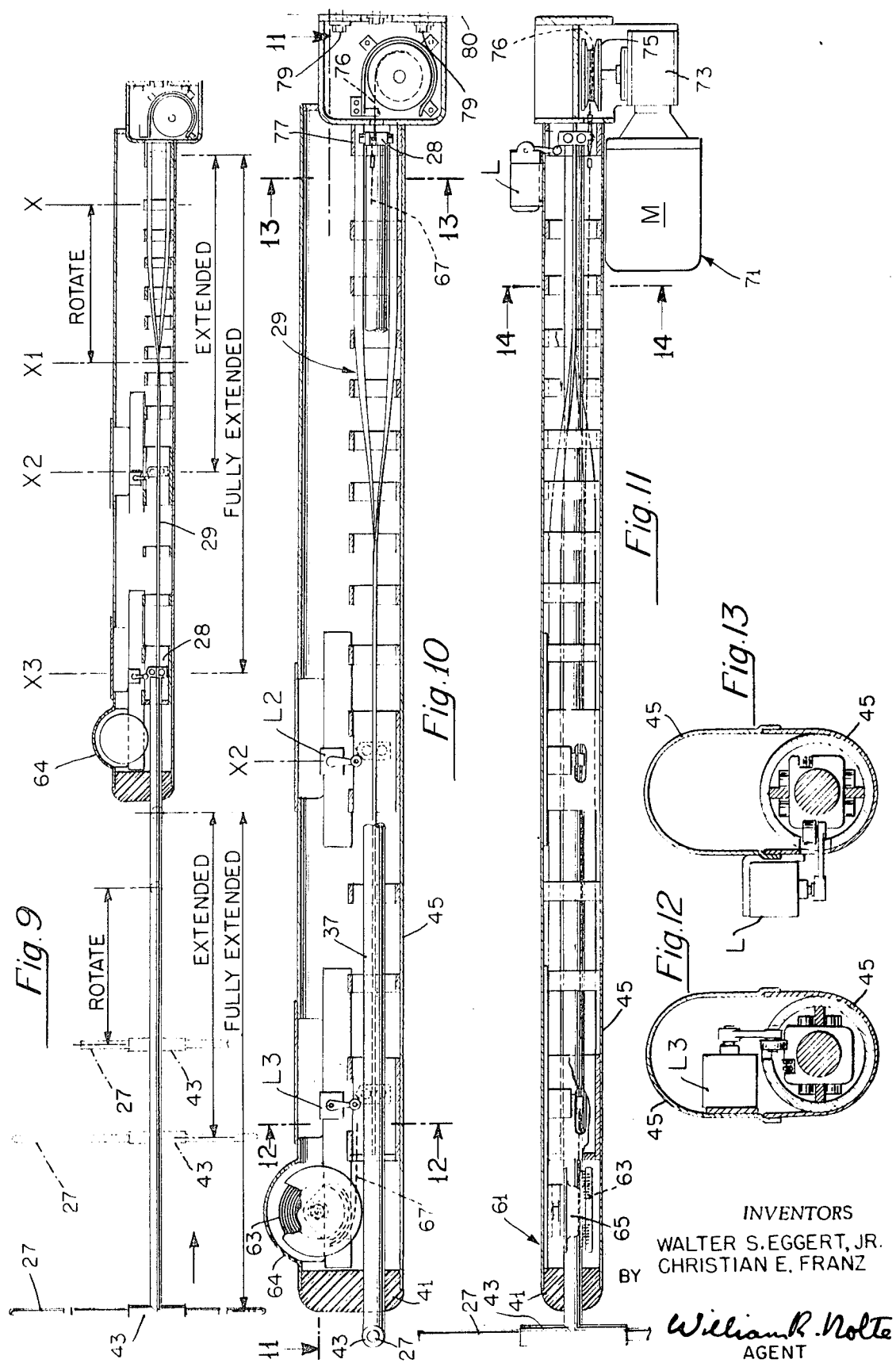

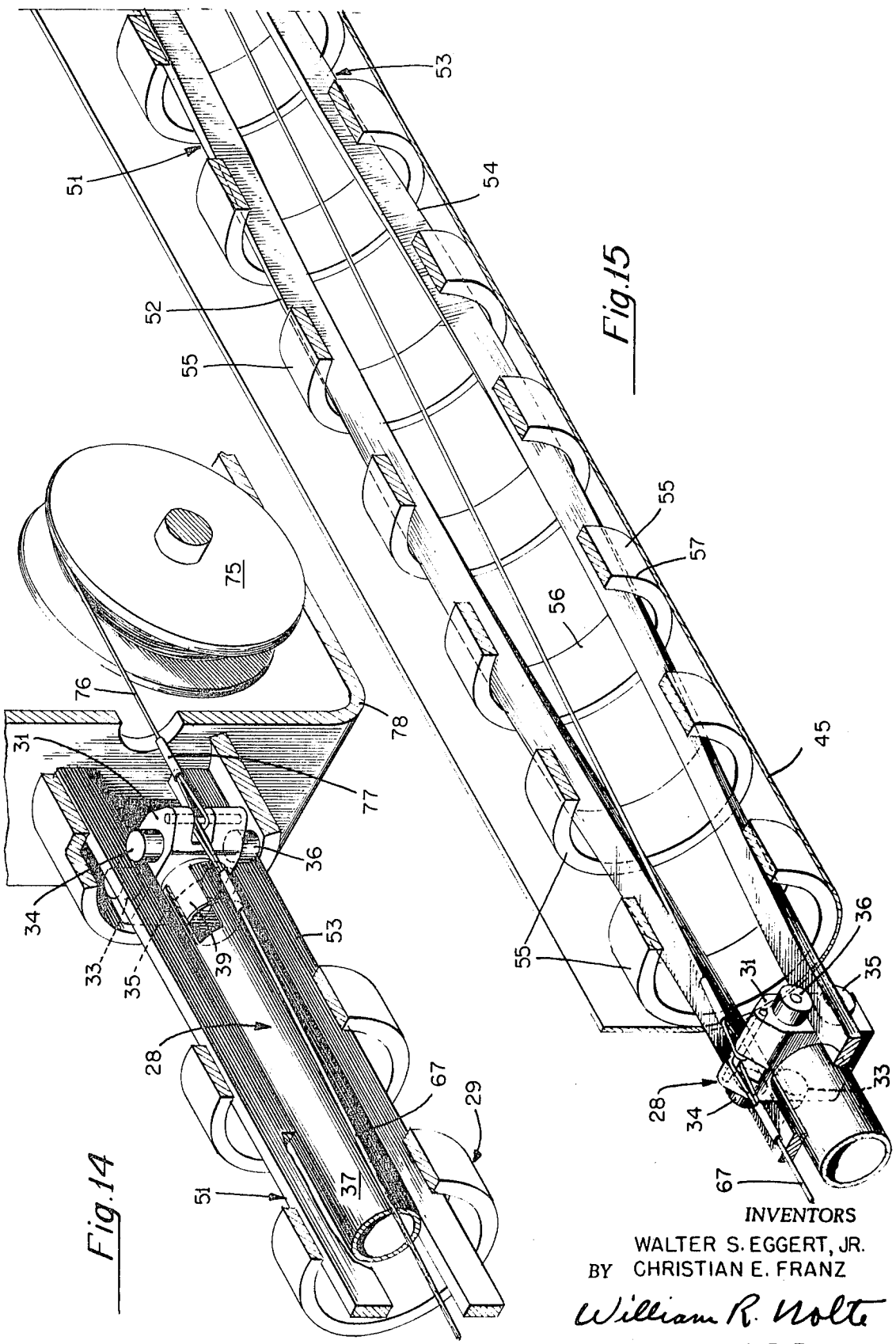

PROBE APPARATUS

This invention has utility in the type of aircraft passenger transfer vehicle shown and described in copending applications Ser. No. 850,142 entitled "Bellows Construction" filed Aug. 14, 1969 and Ser. No. 860,882, entitled "Canopy Apparatus", filed Sept. 25, 1969, both by Walter S. Eggert, Jr., and both assigned to the same assignee as the instant application. The vehicle enables the transporting of airline passengers between airline terminal buildings and parked aircraft. An elevatable pod or compartment for carrying passengers is mounted on a pair of guide posts extending from a four-wheeled chassis. The pod can be positioned so that its doorsill is brought exactly against the threshold of a commercial airliner. In the above-identified copending applications gangway and canopy structures associated with the passenger pods of these vehicles are described. Due to the great width of the vehicle plus the extent to which the gangway can be extended and rotated, visual alignment aids are required to enable accurate mating of the pod with the aircraft.

All movement of the vehicle across the ground surface is done with the pod of the vehicle in its down position. Thus in normal operation, the vehicle is driven at the correct approach angle to the side of the aircraft and the front face of the pod is spaced a short distance from the plane of the doorway of the aircraft. In this down position the gangway and canopy apparatus of the pod are retracted. Once that it is determined that the aircraft is properly aligned and that the front of the vehicle is the proper distance from the aircraft, the pod is elevated to the correct position so that the threshold of its extendable and rotatable gangway is even with and at the same elevation as the doorsill of the aircraft. Thereafter the gangway can be extended as desired and its turntable properly rotated to accomplish the final mating of the gangway with the parked aircraft. In order to avoid lowering of the pod and thereafter moving the vehicle across the ground surface to make a fresh approach, it is necessary that careful alignment of the vehicle with the aircraft be initially accomplished when the pod is in its down position.

Due to the great extent to which the canopy can be extended and conversely the narrow envelope into which the gangway-canopy can be retracted, suitable and compatible visual means must be provided to enable alternate use of the visual means and the gangway-canopy structure.

Accordingly it is the principal object of this invention to provide a novel visual sighting apparatus to facilitate mating of a wheeled vehicle having an extendable canopy structure with a doorway opening in a fixed structure.

Another important object of this invention is to provide a novel visual sighting apparatus for a vehicle which can be extended and retracted in a manner to enable subsequent extension of other apparatus of the vehicle.

In accordance with the invention visual sighting probe apparatus is provided for a passenger transfer vehicle to enable alignment of a passenger pod of the vehicle with a doorway in a parked aircraft or other structure. The apparatus comprises a movable sighting element or bar mounted transversely to a longitudinal supporting member of movable carriage means. Track means are provided for guiding the carriage means. Resilient means connected to the carriage means normally urge the sighting rod in one direction toward the structure containing the doorway drive means connected to the carriage means, with means for actuating the same urging the carriage means to a retracted position against the urging of said resilient means.

For a better understanding of the invention together with other and further objects thereof reference is had to the following description taken in connection with the accompanying drawings.

In the drawings

FIG. 1 is a schematic side elevational view of an aircraft transfer vehicle embodying the present invention and shown approaching a parked aircraft with the passenger pod of the vehicle in its down position and its gangway canopy apparatus retracted;

FIG. 2 is a front elevational schematic view of the aircraft passenger transfer vehicle shown in FIG. 1;

FIG. 3 is a top plan view of the vehicle embodying the apparatus shown in FIG. 1 with the passenger pod of the vehicle in its down position;

FIG. 4 is a view similar to that shown in FIG. 1 with the passenger pod in its elevated position and with portions of the sighting apparatus retracted and rotated to provide clearance for the gangway canopy apparatus which is extended to mate with the parked aircraft, enabling passengers to pass between the aircraft and the vehicle;

FIG. 5 is a top plan view of portions of the vehicle and aircraft shown in FIG. 4 with the sighting bar rotated to a horizontal position and retracted;

FIGS. 6, 7, 8 and 8a are views similar to FIG. 3 but illustrating different angles of approach of the transfer vehicle with the parked aircraft;

FIG. 9 is a sectional view taken through the probe unit along lines 9—9 of FIG. 3;

FIG. 10 is an enlarged view corresponding to one end portion of FIG. 9 with the sighting bar rotated and withdrawn to its horizontal retracted position;

FIG. 11 is a longitudinal sectional view with portions broken away taken along the lines 11—11 of FIG. 10;

FIG. 12 is a vertical cross-sectional view taken along the lines 12—12 of FIG. 10 and showing the relationship of one of the limit switches for controlling the movement of the sighting bar supporting rod;

FIG. 13 is a view similar to FIG. 12 and showing another limit switch;

FIG. 14 is a three-quarter pictorial as viewed generally along the lines 14—14 of FIG. 11 and showing the relationship of the track and carriage mechanism; and FIG. 15 is a view similar to FIG. 14 but showing the carriage advanced outwardly to another portion of the track.

Referring to FIGS. 1 to 4 of the drawing there is shown an aircraft passenger transfer vehicle 10 embodying the sight probe apparatus 11 of the present invention. The vehicle includes a four-wheeled chassis 13 with a pair of spaced apart vertical lifting posts 15. A passenger compartment 17 may be elevated or lowered on the lifting posts 15 to enable the transfer of passengers between a parked aircraft 19, shown in partial cross-section and the pod of the vehicle. The apparatus may be used for aircraft having different cross-sectional shapes of fuselage as illustrated in phantom by reference numeral 20. The parked aircraft are illustrated as including interior floor structures 21, 22 respectively which may be of different elevations above the ground surface. The lifting poles 15 enable the pod 17 of the vehicle to be elevated to a height to permit passengers to walk between such aircraft and the pod of the vehicle. For this purpose an extendable gangway-canopy mechanism 25 mounted for movement at the front of the vehicle, FIG. 3, may be extended to the position shown in FIG. 4 to enable passengers to walk therebetween. The operation of the vehicle 10 is such that it travels along the ground surface only when its pod 17 is in the down position. Due to the wide variation of floor levels of the aircraft, and the different angles of approach required for mating with the various aircraft, novel visual sighting probe apparatus 11 are provided.

With reference now to FIGS. 9, 10 and 11 the novel sighting probe apparatus of the present invention includes a sighting bar 27 which when extended assumes a vertical position, FIGS. 1, 2 and 9, and assumes, when retracted, a horizontal position, FIGS. 4 and 11. In order to accomplish extension and retraction of the sighting bar, carriage means 28, and track means 29 are provided. The carriage means include a block member 31 having pairs of spaced apart top and bottom rollers 33, 34 and 35, 36 respectively, FIG. 14. A horizontal disposed support member or tube 37 is mounted at its inner end thereof as by press-fitting to a cylindrical boss 39 which projects from a central portion of the carriage block 31. The other end of the member is supported, FIG. 10, by a bearing block 41 of suitable plastic material, and passes through aperture 42 therein to make connection at 43 with the sighting rod 27. The bearing block 41 is suitably gripped by top and bottom trough-like casing members 43, 45 respectively which house the carriage means 28, and track means 29.

With reference now to FIGS. 14 and 15 it is seen that the track means 29 include a pair of oppositely disposed track members 51, 53 each in the form of a narrow strip of rectangular cross-section and having its inner end portion twisted in the present instance into the form of a helix. The strips are disposed horizontally and parallel to the axis of the support tube and spaced radially from the outside surface of the latter. The outside edges 52, 54 respectively of strips 51, 53 are suitably fixed to the inner peripheries 56 of a plurality of axially disposed ring members 55. The outer peripheral surfaces 57 of the ring members are securely fixed to the aforementioned lower trough member 45. Referring now to FIG. 9 it is seen that the parallel helical twist portions of the track members 51, 53 extend between the locations X and X1. Beyond X1 the track elements 51, 53 extend outwardly to locations X2 and X3 in an untwisted or straight parallel relationship. In order to extend the carriage 28 outward along the track from location X to X1, X2, X3, means 61 in the form of a spring mechanism includes a flat coil spring 63 contained in a drum housing 64 produces torque to rotate pulley 65 on which is wound one end of drive cable 67, see FIG. 11. The other end of the cable is attached to the carriage block 31 as at 68. Motor means 71 at opposite end of the housing trough 45 from the location of the spring means 61 are provided to move the carriage in a direction opposite to that imparted by spring means 61. For this purpose a suitable reversible electric motor M having a built-in brake apparatus is provided. The motor through a right angle gear drive 73, applies torque to pulley 75 upon which is fixed one end of second cable means 76. The outer end of the cable 76 is suitably secured to the carriage block 31 as at 77, FIG. 14. An interface housing or casting 78 supports the track assembly 29, right angle gear drive 73 and motor M to the front face 80 of the pod structure 17 as by volts 79. A limit switch L FIG. 11, is provided to cooperate with the carriage block 31 when the latter is moved outwardly by spring motor means 61 through cable 67, while limit switch L3 is provided corresponding to the location X3 and is effective to disable the motor M when the carriage block 31 is moved outwardly to location X3. Conversely in an opposite direction of movement of carriage block 31 limit switch L2 cooperates with the block to limit the rotation of the motor M in its retractive effort. Normally the motor M is of the type which may be actuated in one direction of rotation to play out a sufficient length of cable 76 to enable the carriage 31 to be positioned at either location X2 or X3.

With reference now to FIG. 3, there is illustrated a straight on, or normal angular approach of the transfer vehicle to the parked aircraft 19. It is observed that the longitudinal axis of the vehicle via the sighting rod 27 is aimed to intersect the hinge portion 82 of the door 81 of the vehicle. With the vehicle so positioned the sighting rod 27 may then be withdrawn and retracted to its horizontal position as illustrated in FIGS. 4 and 5. Thereafter with the sighting bar so retracted, the gangway-canopy apparatus may then be actuated from its retracted position shown in FIG. 3 to its extended position illustrated in FIGS. 4 and 5 in which the forward edges of the same engages the outer skin surface of fuselage 19. Thereafter the door of the aircraft may be swung open from its closed full line position to its open position shown in phantom, within the enclosure apparatus of the vehicle.

With reference now to FIGS. 6 and 8, the same illustrate angular approaches of between 10 and 20 degrees of the vehicle 10 to the parked aircraft. FIG. 6 illustrates moreover a negative angle of approach in which the axis of the vehicle 10 via sighting rod 27 is aligned to intersect an imaginary line designated A1. The latter line is positioned approximately one-half the width of the door 81 forwardly of the hinge line 82 of the door. It is observed further in this approach of the vehicle that the sighting rod 27 is again positioned outwardly to its first outward position corresponding to the location X2 of the carriage block 31. With the vehicle 10 and the sighting rod 27 thus properly aligned as illustrated in FIG. 6 the latter rod may then be withdrawn prior to extending the gangway-canopy apparatus as illustrated in phantom, to enable opening of the door 81 to its phantom line position to enable transfer of passengers through the doorway between the parked aircraft and the vehicle 10. With respect to FIG. 7 the relationship regarding the distance to which the sighting rod is extended is the same as that illustrated in FIG. 6, the difference being that FIG. 7 corresponds to a positive angle of approach rather than a negative angle of approach. It is further observed that the axis of the vehicle is moreover aligned to intersect a line A1 corresponding to one-half the door width located aft of the hinge 82 relative to the direction of flight of the aircraft.

In connection with FIG. 8 and 8a, the former illustrates the manner of approach of the passenger transfer vehicle for negative angles of approach between 10L to 20L relative to transverse axis of the parked aircraft. Angles of the latter magnitude may be dictated by angle which the trailing edge 86 of the wing 85 of the aircraft. To accommodate for mating under such circumstances, the sighting rod 27 by means of its supporting boom 37 is positioned outwardly to its full extended location. This corresponds to the carriage block coinciding with the location indicated by the line designated X3 in FIGS. 9 and 10. The axis of the vehicle is shown aligned so that the sighting bar 27 intersects a transverse line extending normal to the axis of the parked aircraft which is one full door width distance forward of the hinge 81. When so aligned, the sighting bar of the probe apparatus may then be retracted, while the gangway-canopy apparatus is extended and rotated in a manner illustrated in phantom lines to mate with the side of the aircraft. By contrast, FIG. 8A illustrates the manner by which positive angles of approach are made by the vehicle 10 corresponding to the negative angular range illustrated in FIG. 8. In all respects the approach procedures are identical excepting that an axis of the vehicle is aligned one door width aft of the hinge 81.

From the above described construction of the probe apparatus it can be seen that in the event of accident or mistake in which the probe is caused to contact the aircraft little or no damage can occur to either the aircraft or the probe apparatus due to the outward spring loading of the sighting bar 27 by means of ribbon spring 63, FIG. 11. This follows because the force of the spring 63 is normally little more than is required to extend the carriage 31 including the boom 37 when a sufficient length of cable 67 has been played out by the motor M.

While there has been described what at present is considered to be the preferred embodiment of this invention, it will be obvious to those skilled in the art that various changes and modifications may be made therein without departing from the invention, and it is therefore, aimed in the appended claims to cover all such changes and modifications as fall within the true spirit of this invention.

What is claimed is:

1. Probe apparatus for an aircraft transfer vehicle comprising, an elongated sighting element, carriage means including an elongated support member secured to said elongated sighting element, track means for guiding said carriage means, resilient means normally urging said carriage means in one direction, and drive means connected to said carriage means for moving said carriage means in an opposite direction against the action of said resilient means, said track means includes a pair of opposed track elements engaged by said carriage means, said opposed track elements having portions twisted in the form of a helix, whereby movement of said carriage in said opposite direction causes said sighting element to be rotated relative to the axis of said helix.

2. In the probe apparatus as set forth in claim 1 and including cable means connected between said resilient means and said carriage means, and reel means connected with said resilient means for winding said cable means thereon upon movement of said carriage means in said one direction.

3. In the probe apparatus as set forth in claim 2 and including second cable means connected to said drive means, said drive means having pulley means for winding said second cable means thereon.

4. In the probe apparatus as set forth in claim 1 and including sleeve means secured to said pair of track elements, said sleeve means serving to maintain said track elements in spaced apart relationship.

5. In the probe apparatus as set froth in claim 1 wherein said pair of opposed track elements include straight portions contiguous with said twisted portions whereby movement of said carriage means therealong extends said sighting bar means non-rotatively.

6. Probe apparatus for an aircraft transfer vehicle having canopy means adapted to be extended longitudinally of said vehicle in one position of movement and retracted in another position of movement thereof, elongated sighting means adapted to be extended when said canopy means is retracted to occupy space which would be occupied by said canopy when in its said one position, carriage means including elongated support means secured to said sighting means, track means for guiding said carriage means, resilient means normally urging said carriage means to extend said sighting means, and drive means connected to said carriage means for retracting the same against the action of resilient means, said track means includes a helical portion and a straight portion, whereby movement of said carriage means along said helical portion moves said sighting means longitudinally of said vehicle and simultaneously rotates the same and upon further movement of said carriage means along said straight portion said sighting means is extended longitudinally further with respect to said vehicle.

7. Probe apparatus for an aircraft transfer vehicle comprising, an elongated sighting element lying in a vertical plane, carriage means including an elongated support member secured to said elongated sighting element, track means for guiding said carriage means and rotating said sighting element, and means for moving said carriage means back and forth along said track means.

* * * * *